March 16, 1954    H. P. G. A. R. VON ZBOROWSKI    2,672,011
CENTRIFUGAL FUEL SUPPLY FOR CONTINUOUS
FLOW INTERNAL-COMBUSTION ENGINES
Filed Aug. 18, 1951             2 Sheets-Sheet 1
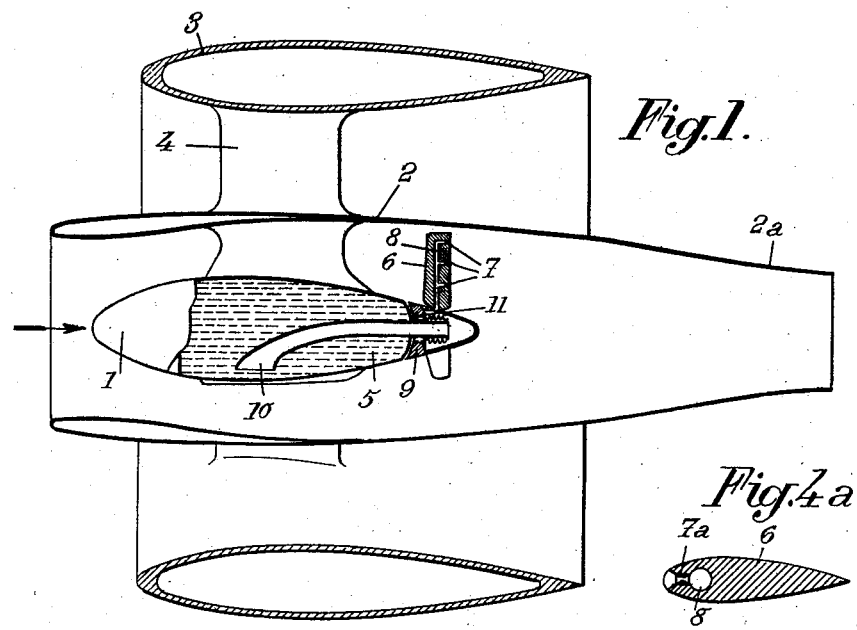
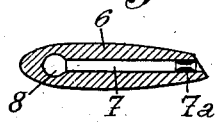 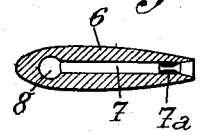 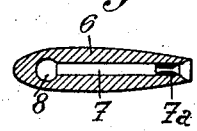
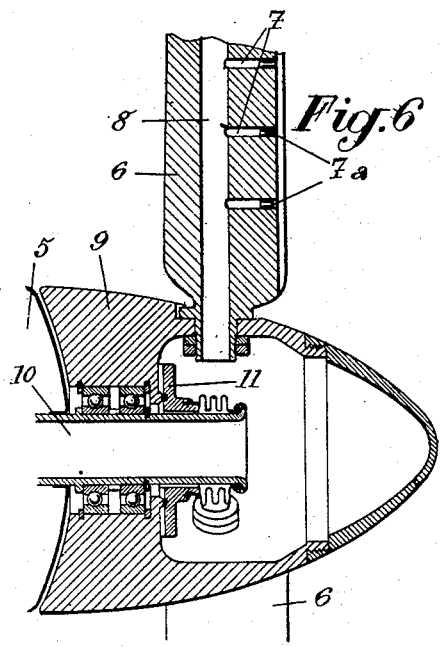 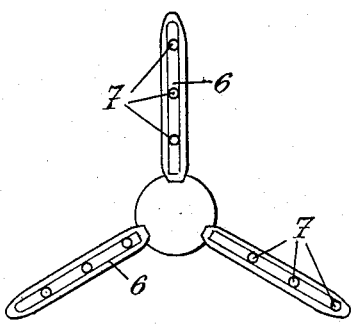
INVENTOR:
HELMUT PH. G.A.R. VON ZBOROWSKI
BY
Richardson, David and Nordon
ATTORNEYS Patented Mar. 16, 1954

2,672,011

UNITED STATES PATENT OFFICE 2,672,011

CENTRIFUGAL FUEL SUPPLY FOR CONTINUOUS FLOW INTERNAL-COMBUSTION ENGINES

Helmut P. G. A. R. von Zborowski, Paris, France

Application August 18, 1951, Serial No. 242,493

Claims priority, application France November 13, 1950

10 Claims. (Cl. 60—39.28)

The present invention relates to centrifugal fuel supply system for continuous flow internal combustion engines, this expression including all thermal machines or plants including one or several combustion chambers through which a continuous (or substantially continuous in the case of pulse-jets) flow of fuel is required, and it is more particularly concerned with ram-jets for flying machines.

The object of my invention is to provide an engine of this kind which is better adapted to meet the requirements of practice than those existing at the present time, in particular concerning the distribution of fuel into the stream of combustion air which passes through the engine.

Preferred embodiments of my invention will be hereinafter described with reference to the accompanying drawings, given merely by way of example, and in which:

Fig. 1 diagrammatically shows, in longitudinal section, a ram-jet aircraft made according to my invention;

Figs. 2 to 4a are cross sections of four different forms of airscrew blades according to my invention;

Fig. 5 is a rear view of the airscrew in question;

Fig. 6 is a large scale view of a packing joint diagrammatically shown in Fig. 1;

Figure 9:
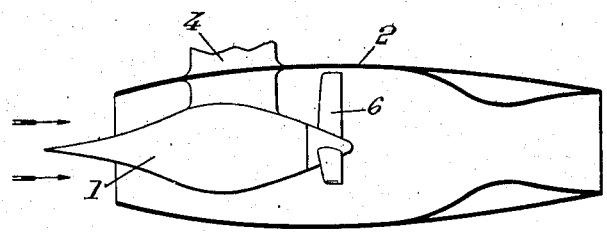

Fig. 9 diagrammatically shows a modification of the ram-jet of Fig. 1, intended for use on a supersonic aircraft.

In the following description, it will be assumed that the power plant according to my invention is fitted on a guided flying missile.

The engine (with the exception of its fuel supply system) may be of any suitable conventional or other type. For instance, as shown by Fig. 1, it includes, around a streamlined central body 1, an envelope 2, having preferably a rounded leading edge and a sharp trailing edge forming the outer wall of the ram-jet. The air for the combustion of the fuel flows (in the direction indicated by the arrow) through the annular space between streamlined body 1 and envelope 2, the rear portion of which constitutes the jet nozzle.

The power plant is fitted in a supporting wing 3, for instance of the ring or annular type, connected with envelope 2 through radial streamlined arms 4.

The power plant is provided with a fuel tank 5, which may be housed in the annular wing 3 or in the leading edge portion of envelope, or again, as shown by the drawing, in the rear portion of streamlined body 1.

It is reminded that, up to now, the means for achieving a satisfactory feed of the fuel to the combustion chamber of a ram-jet engine were expensive, complicated and delicate, which partly counter-balanced the advantages of simplicity of ram-jet engines.

According to my invention, the fuel feed device includes at least one airscrew having hollow blades 6 and disposed in the air stream which flows through envelope 2 so as to be driven by said air stream. This airscrew acts as a kind of centrifugal pump for drawing fuel from tank 5 to outlet passages 7 provided in said hollow blades.

Preferably, this airscrew is located in the portion of envelope 2 where the cross section is maximum.

Outlet passages 7 may open into the trailing edge portions of blades 6. In this case, these trailing edge portions are relatively thick. They may be flat, as shown by Fig. 2, or concave as shown by Figs. 3 and 4 (the longitudinal section being trapezoidal in the case of Fig. 3 and semi-circular in the case of Fig. 4).

I may also, as shown by Fig. 4a, provide outlet passages which open into the leading edge portions of the airscrew blades, so as to obtain a better scattering of the fuel jets which are directed in opposition to the relative air stream.

Discharge conduits 7 are advantageously parallel to the chords of the blade profiles. Calibrated jets 7a are preferably fitted in passages 7, to make it possible to obtain fine drops of fuel.

The distance between two consecutive outlet conduits 7 may range, for instance from two to ten centimeters, according to the number of blades of the airscrew. These passages 8 are all in communication with a feed conduit 8, for instance of cylindrical shape.

Furthermore, the respective distances of the outlet orifices from the axis of the propeller should be different for the respective blades, as shown by Fig. 5. All these orifices should be located on concentric circles such that the difference between the radius of one circle and that of the next one is constant.

Preferably, the fuel outlet orifices, instead of being distributed at equal intervals over the whole length of the blade, are grouped in a portion thereof so as to ensure behind this portion a mean temperature of combustion which is higher than the temperature of spontaneous ignition of the fuel, the center of this portion fitted with fuel outlet orifices being about halfway of the length of the blade.

The external profiles of blades 6 are advantageously symmetrical.

The hollow hub 9 of the airscrew turns about the top end of a suction pipe 10 which dips in tank 5. A packing joint 11 is provided between said hub and said top end of pipe 10. In view of the low pressures which prevail, this joint may be of the hydrodynamic type (forming a centrifugal pump so as to prevent or, to be more accurate, to drive back, liquid leaks). An element of such a joint is shown on an enlarged scale on Fig. 6.

Pipe 10 may be mounted free to turn so that its bent upstream end comes in the direction of the apparent vertical.

With such a device, practically the whole of the cross section of the air stream flowing through envelope 2 is swept by discharge conduits 7 (see Fig. 5). Furthermore, the fuel injection pressure, and therefore the fuel flow rate, is the higher as the discharge conduit is located at a greater distance from the center, i. e. as the path swept by said conduit is greater. In other words, the greater the volume of air to be supplied with fuel through a discharge conduit, the higher the flow rate through this conduit.

Furthermore, since the airscrew is driven by the air stream flowing through the ram-jet engine, the rate of feed of fuel increases automatically when the rate of flow of air through said engine increases, thus ensuring a kind of self-regulation.

Consequently, the device according to my invention has a high thermal stability, i. e. a high stability of the difference between the temperatures existing respectively upstream and downstream of the airscrew.

However, it should be noted that the above mentioned self-regulation and stability can be obtained, practically, only if the inner wall of envelope 2 is suitably streamlined and, in particular, if the leading edge is rounded and the trailing edge sharp.

Another advantage of my system is that there is formed, inside envelope 2, a sufficiently turbulent wake downstream of the propeller to make it unnecessary to provide a combustion stabilizing grid.

It should be noted that the necessity, in a device of the kind above described, to achieve a minimum speed of revolution of the airscrew to obtain a distribution of fuel does not constitute a drawback since the ram-jet itself can only operate when there is a minimum rate of flow of the air stream which enters it.

In order to be able to vary the thrust supplied by the ram-jet engine, means are to be provided for varying the relative output of the airscrew above described. These means may act, for instance, either on the speed of revolution of the airscrew or on the number of outlet orifices 7 in service.

Variation of the speed of revolution of the airscrew may be obtained through any conventional means, for instance:

either by varying the pitch of the blades of said airscrew, or by modifying the useful cross section of the jet flowing out through nozzle portion 2a.

These adjusting means may be controlled either by the pilot or through automatic means operated for instance by a machmeter.

Figure 7:
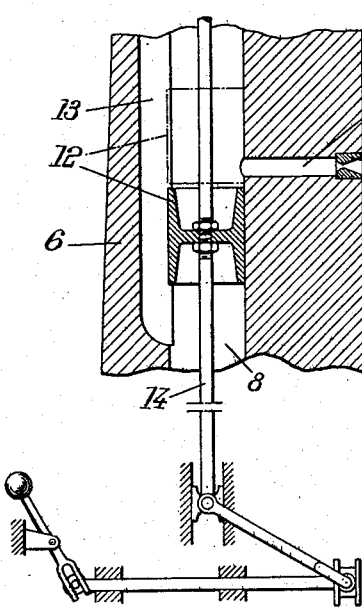
Figs. 7 and 8 are two different embodiments of fuel flow control devices, respectively.

If the thrust variation is to be obtained by bringing into or out of action one or several outlet orifices, I advantageously proceed as shown by Fig. 7.

In this case, I provide in the radial conduit 8 of the blade, a kind of slide valve 12 by means of which the desired discharge passages 7 may be stopped, fuel passing to the other delivery passages 7 through a by-pass passage 13.

In the position of slide valve 12 shown in solid lines, fuel is fed to the passage 7 shown by Fig. 7. When this slide valve is moved into the position shown in dotted lines, this passage 7 is stopped.

Slide valve 12 may be controlled by means of a rod 14 actuated by the pilot through any suitable link system, as shown by Fig. 7.

In order to obtain an automatic regulation, slide valve 12 may be controlled by a system responsive to variations either of the centrifugal force or of the Mach number.

Figure 8:
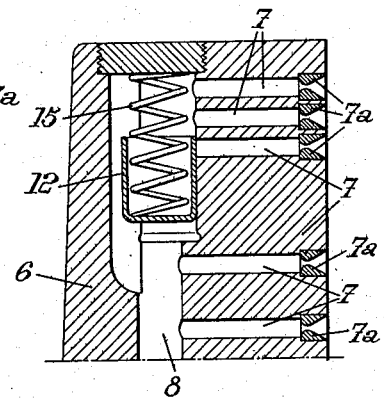

Fig. 8 shows an arrangement responsive to variations of the centrifugal force. Slide valve 12 is subjected to the action of a spring 15 acting in a direction opposed to the direction of action of the centrifugal force. The strength of this spring is such that when the number of revolutions per unit of time exceeds a given value, this spring yields and slide valve 12 comes to stop passage 7.

Of course, the same slide valve may be used to control a plurality of delivery passages 7 provided in the same blade.

If the position of the slide valve 12 is controlled in response to the variations of the Mach number, the machmeter would preferably be arranged so that the value for which a passage 7 is stopped can be adjusted.

Instead of a single airscrew for distributing the fuel, I might provide two such airscrews, turning for instance in opposed directions.

Said airscrew or airscrews may be used to drive an auxiliary apparatus, for instance an electric generator, the movable elements of this generator being for instance carried by the airscrew spinner, whereas the stator occupies a central position.

If the engine is to be used on a supersonic aircraft, the general principles above set forth are applicable. However, in this case, the envelope 2 must have a sharp leading edge and a convergent-divergent nozzle at the rear, and the front end of central body 1 forms a sharp point, as shown by Fig. 9.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A continuous flow internal combustion engine of the class described, comprising: an enclosure defining a combustion space and extending to form a passage for the flow of a continuous stream of air toward said combustion space; a freely rotatable airscrew having a hollow hub, said airscrew being disposed in said passage to be driven by said stream, said airscrew having at least one blade with a radially outwardly extending fuel passage formed therein, said fuel passage communicating directly with the interior of said hub, said blade having at least one fuel delivery passage formed therein communicating between said radially extending passage and the exterior of said blade; a fuel reservoir; and a continuous suction pipe extending between said hollow hub and said reservoir, whereby said fuel is caused to flow from said tank to said hub by centrifugal action on fuel disposed in said radially extending fuel passage.

2. A combustion engine according to claim 1, in which said fuel reservoir is disposed immediately adjacent to said airscrew.

3. A combustion engine according to claim 2, in which said hub is streamlined and in which said fuel reservoir is streamlined to form a continuation of said hub.

4. A combustion engine according to claim 1, in which said suction pipe consists in its entirety of a conduit extending between the bottom portion of said fuel reservoir and said hollow hub.

5. A combustion engine according to claim 4, in which one end of said conduit is freely rotatably disposed with respect to said reservoir coaxially with respect to said hub, the portion of said conduit communicating with said bottom portion of said reservoir being free to move in accordance with any variation in the effective direction of the vertical.

6. A combustion engine according to claim 1, further comprising a calibrated jet forming orifice disposed in said fuel delivery passage adjacent to said exterior of said blade.

7. A continuous flow internal combustion engine of the class described, comprising: an enclosure defining a combustion space and extending to form a passage for the flow of a continuous stream of air toward said combustion space; a freely rotatable airscrew having a hollow hub, said airscrew being disposed in said passage to be driven by said stream, said airscrew having at least one blade with a radially outwardly extending fuel passage formed therein, said fuel passage communicating directly with the interior of said hub, said blade having a plurality of fuel delivery passages formed therein communicating between said radially extending passage and the exterior of said blade; a fuel reservoir; a pipe extending between said hollow hub and said reservoir, whereby said fuel is caused to flow from said tank to said hub at least in part by centrifugal action on fuel disposed in said radially extending fuel passage; and controllable means carried by said airscrew blade for restricting the rate of fuel flow from said hollow hub to at least one of said fuel delivery passages.

8. A combustion engine according to claim 7, in which said controllable means comprises movable means disposed in said radially extending fuel passage, said movable means comprising a portion progressively displaceable to shut off at least one of said delivery passages.

9. A combustion engine according to claim 8, further comprising link means, comprising a portion connected to said movable means and a portion stationary with respect to said airscrew for displacing said movable means.

10. A combustion engine according to claim 8, further comprising resilient means yieldingly urging said movable means radially inwardly to open said delivery passage, whereby, as the speed of said airscrew increases, the centrifugal force acting on said movable means will increase and said movable means will progressively become displaced radially outwardly against the action of said resilient means shutting off said fuel delivery pasasge.

HELMUT P. G. A. R. von ZBOROWSKI.

References Cited in the file of this patent
UNITED STATES PATENTS

| Number | Name | Date |
|---|---|---|
| 1,862,803 | Porter | June 14, 1932 |
| 2,540,594 | Price | Feb. 6, 1951 |
| 2,566,319 | Deacon | Sept. 4, 1951 |
| 2,575,682 | Price | Nov. 20, 1951 |